INVENTOR
Richard L. Ronning

INVENTOR
Richard L. Ronning

United States Patent Office 3,429,349
Patented Feb. 25, 1969

3,429,349
PULL-THROUGH HAMMER MILL
Richard L. Ronning, 8914 Eby Drive,
Overland Park, Kans. 66212
Filed Sept. 29, 1966, Ser. No. 582,915
U.S. Cl. 146—107          4 Claims
Int. Cl. B02c 13/13

ABSTRACT OF THE DISCLOSURE

A pull-through hammer mill for comminuting agricultural products has a rotor rotatably mounted in a housing. An elongated, arcuate screen is carried by the housing in circumscribing relationship to the rotor. Agricultural products are forced into the housing through an elongated conduit to be ground between the rotor and the screen. A blower is connected to the outlet of the housing for reducing the pressure downstream of the latter thus causing the agricultural products to be pneumatically conveyed into and through the hammer mill.

---

This invention relates to feed processing equipment, and more particularly, to apparatus for comminuting agricultural products.

In the past, feed processing installations, and particularly plants for pelletizing alfalfa, have utilized comminutors fed by gravity for grinding the product prior to the pelletizing operation. Such comminutors generally employed a large collector disposed above the comminutors to provide a gravity flow of the product to the comminutor. In the operation of such installations, large, forced air blowers were usually employed to direct the unground product upwardly from the mill into a comminuted feed collector. In addition to the capital expense of the blower, collector and conveyor system, operating and maintenance expenses were high because of the horsepower requirement and frequent damage to the components of the mill caused by introduction of rocks and similar hard objects into the mill along with the produce to be ground.

It is, therefore, the primary object of the instant invention to provide a pull-through hammer mill for comminuting materials such as agricultural products wherein is provided structure permitting efficient grinding of products entrained in a stream of air pulled through the mill by negative pressure inducing mechanism, whereby heretofore used equipment including blowers, collectors and conveyor systems may be eliminated from such installations, thus minimizing capital expenditures and construction expenses without decreasing the capacity thereof. In addition, the operating and maintenance expenditures of the plant are less than has been possible in the past using known equipment and techniques.

The efficiency of previously known comminutors especially useful for grinding agricultural products has suffered because the operation thereof often resulted, under certain conditions, in the production of a significant quantity of product ground more finely than was desirable. Furthermore, gravity feed of material to be ground to the mill frequently produced erratic overall results because of variations in the moisture content of the material to be ground as well as the size thereof as fed to the mill. This result was, for the most part, caused by the gravity feed of the unground product into and through the comminutor. A very important object of the present invention, therefore, is the provision of a pull-through hammer mill for comminuting agricultural products having rotary means mounting a plurality of hammers for movement along a path of travel adjacent to an arcuate screen circumscribing the rotary means around about three-fourths of the latter whereby smooth passage of the product is assured and the production of fines in the product flowing therethrough is minimized. As a result, production of properly sized product is maintained close to the theoretical maximum dependent primarily only on the rate of supply of material to the comminutor.

Another very important object of the invention is the provision of such a hammer mill wherein is provided structure including a screen having a relatively large open area for permitting flow of air and products therethrough without creating substantial pressure drops, to the end that the air entraining the product may be efficiently drawn through the mill by negative pressure inducing mechanism.

Another important object of the instant invention is the provision of a pull-through hammer mill including self-limiting screen structure operable to reduce flow of products through the mill upon clogging of the screen because the increased pressure drop decreases the air flow, whereby the supply of products to the machine is immediately apparent and permits shutting off of the comminutor for cleaning thereof before clogging of the screen occurs to a point which would make the cleaning operation extremely difficult or cause damage to the components of the mill, e.g. the shaft bearings, or result in overloading of the motor.

Yet another very important object of the present invention is to provide inlet means for such a pull-through hammer mill causing unground product to be directed at the periphery of the rotor substantially tangentially thereof whereby production of properly sized product is maintained close to the maximum with minimal production of fines. By virtue of this arrangement, unground materials introduced into the mill are not initially subjected to maximum impact forces. Thus, the softer particles are fractured and sized by the perforations in the screen but complete fragmentation thereof into extremely small particles known as "fines" is minimized. This feature is especially important in the grinding of alfalfa to prevent over-comminution of the relatively fragile leaves thereof.

As a corollary to the foregoing object, it is an important aim of the invention to provide a comminutor as described having novel wall construction disposed to permit unground particles to move tangentially of the rotor, thereafter contact one of the walls of the mill and thence be deflected in a direction toward the center of the rotor in generally radial relationship thereto whereby the particles are subjected to maximum impact forces from the hammers. Furthermore, the impact of the hammers on the unground particles, even though of maximum force, is still substantially constant and, therefore, not only is the size of the product leaving the mill more uniform than was possible using previously known comminutors, but the efficiency of the unit is also greater.

A further important object of the instant invention is to provide a screen circumscribing the rotor for about three-fourths of the circumference of the latter to the end that a significantly greater number of product sizing orifices are provided to permit properly sized particles to leave the comminutor chamber as soon as they become properly sized, thus reducing the likelihood of further reduction of the size thereof.

Broadly, the present invention provides a novel pull-through hammer mill having a perforated screen of greater than normal length and providing clearance of minimum dimension between the screen and the rotor throughout a significant part of the circumference thereof. The mill is designed to be utilized for grinding products in combination with a suction fan or similar vacuum inducing device for pulling air and entrained products therethrough, thereby decreasing the overall installation and operating costs of a plant for reducing the particle size of agricultural products, while at the same time assuring production of a final product of relatively uniform size.

Figure 1:
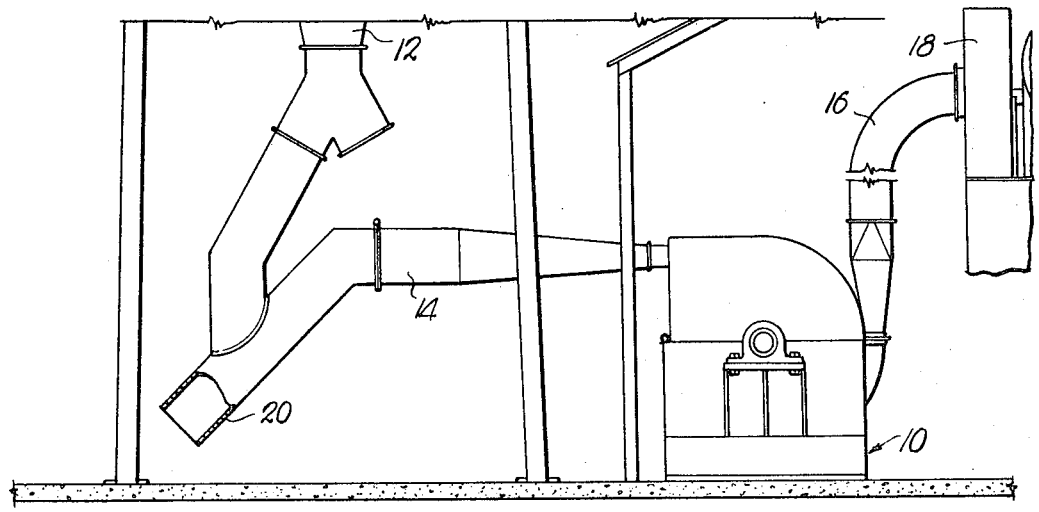
FIGURE 1 is an elevational view of certain portions of a feed processing installation including the pull-through hammer mill of the instant invention.
Figure 2:
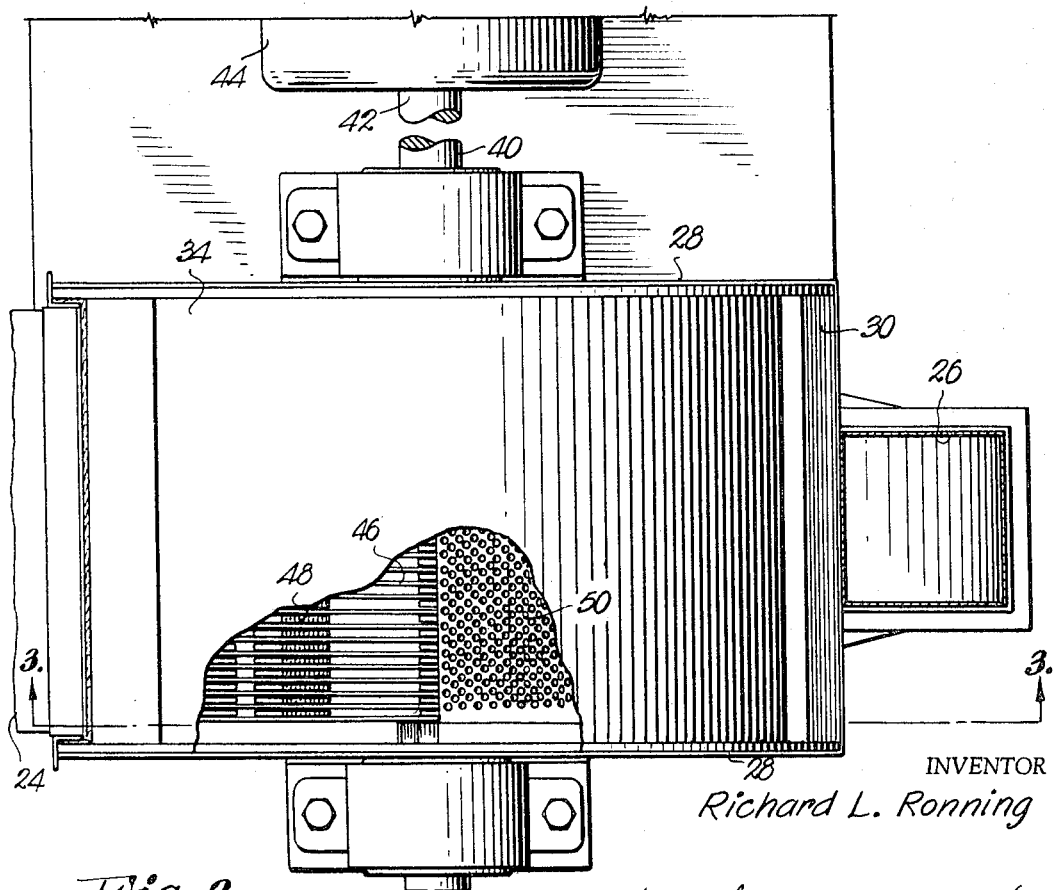
FIG. 2 is an enlarged, top plan view of the pull-through hammer mill with certain parts broken away and in section to reveal details of construction.

A hammer mill 10 embodying the principles of the instant invention is shown in FIG. 1 in disposition for receiving and comminuting agricultural products such as alfalfa drawn from a collector 12 through conduits 14 and 16 by a vacuum inducing blower 18. It is to be understood that although blower 18 is shown directly downstream from hammer mill 10, the exact location of blower 18 is unimportant so long as a sufficient negative pressure is created within conduit 16. It is to be noted that conduit 14 is provided with an open mouth chute 20 for permitting heavy objects to gravitate from conduit 14 upstream from hammer mill 10. Manifestly, agricultural products, such as alfalfa or hay, which are generally gathered by large automatic harvesting machines may include objects such as rocks or the like which must be excluded from hammer mill 10. The products gravitating from the lower end of collector 12 are caused to flow into conduit 14 by the negative pressure therein induced by blower 18. It can therefore be seen that heavy objects such as rocks will gravitate through chute 20 and fall onto the ground or into a receptacle therefor.

Hammer mill 10, as illustrated, embodies the preferred principles of the instant invention and is especially adapted for grinding or comminuting products caused to flow therethrough and generally entrained in a stream of low pressure air through the mill and induced by blower 18. Mill 10 includes a housing 22 made up of a lower stationary section 22b and an upper section 22a pivotally coupled to housing section 22b by hinge means 23. Housing 22 has structure at the upper and lower portions thereof respectively, presenting an inlet 24 and an outlet 26. Sidewalls 28, arcuate walls 30 adjacent outlet 26, and flat walls 32 and 34 adjacent inlet 24 define a chamber 36 within housing 22 between inlet 24 and outlet 26.

A rotor 38 is mounted for rotation with a shaft 40 extending between walls 28 through chamber 36. Shaft 40 has an end 42 extending externally from housing 22 and is coupled with a prime mover 44 operable to rotate shaft 40 and thereby rotor 38 about the axis of shaft 40. Rotor 38 includes a plurality of circular plates 46 disposed in spaced-apart relationship with respect to one another along shaft 40 throughout substantially the entire length of the latter between walls 28. Each plate 46 has a plurality of radially extending hammer elements 48 pivotally mounted thereon by means 50 for rotation about a horizontal axis as can clearly be seen in FIG. 3.

Figure 3:
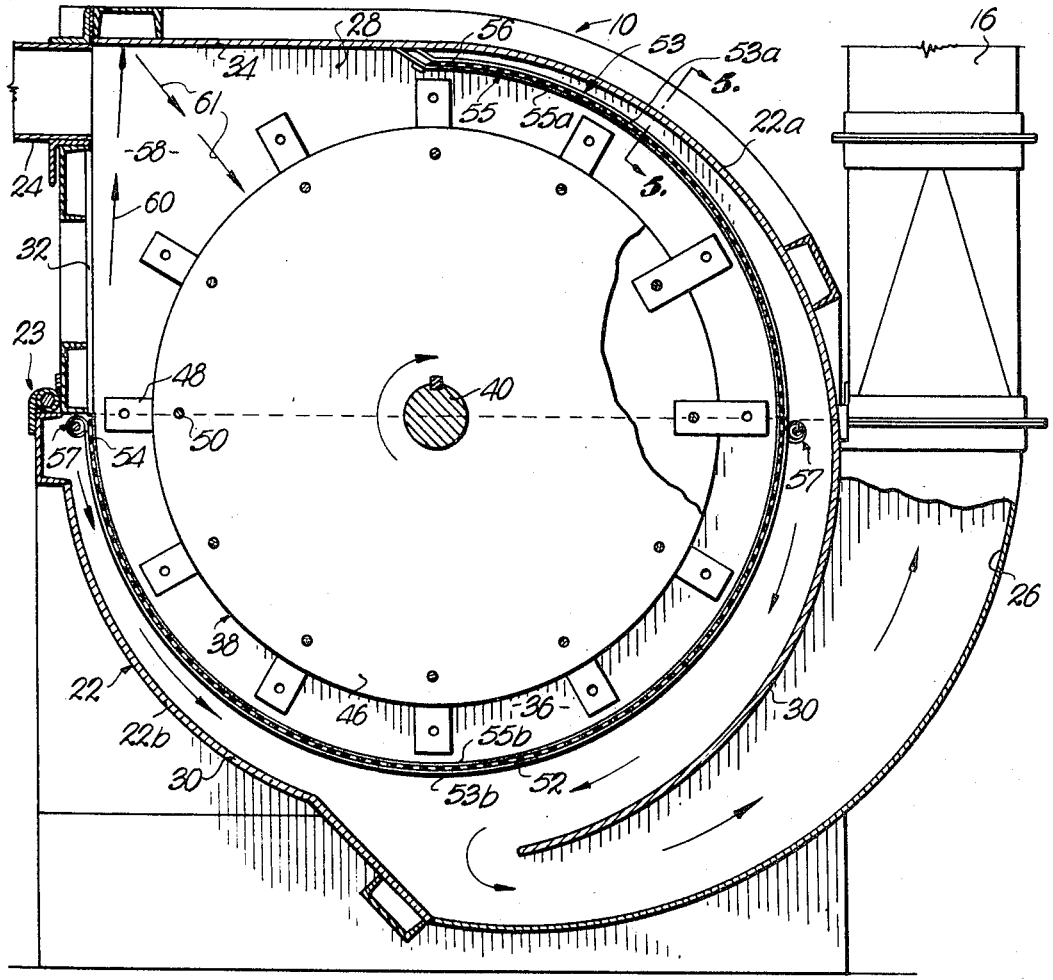
FIG. 3 is a vertical cross-sectional view taken along line 3—3 of FIG. 2.
Figure 4:
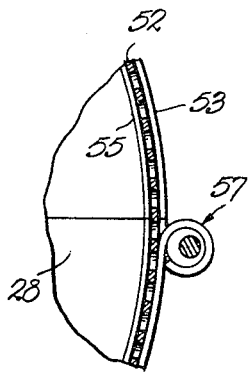
FIG. 4 is an enlarged, fragmentary detail view of the screen tightening mechanism.
Figure 5:
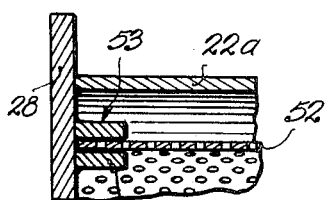
FIG. 5 is a sectional view taken along line 5—5 of FIG. 3.

An elongated, longitudinally arcuate, perforated screen 52 is carried by the housing extending transversely thereof between walls 28. Screen 52, as can be seen in FIGS. 3 and 5, is slidably received between arcuate straps 53 and 55 on corresponding walls 28 and is thereby disposed within chamber 36 in circumscribing relationship with respect to rotor 38 and between the latter and outlet 26. The straps 53 and 55 are constructed to provide upper and lower separate semicircular sections 53a, 53b, 55a and 55b, respectively. Opposite ends of sections 53b are coupled to eccentric units 57 mounted on the lower section 22a of housing 22 to permit tightening of the straps 53b against the screen to force the latter into tight frictional engagement with straps 55b. The downstream end 54 of screen 52 is disposed in proximal relationship with respect to inlet 24 at the lower end of wall 32, while the other end 56 of screen 52 is disposed in proximal relationship with respect to inlet 24 at the right-hand end of flat wall 34. Thus, screen 52 extends approximately 270° around rotor 38. It is to be noted that during the revolution of rotor 38, hammer elements 48 rotate therewith in a cylindrical path of travel adjacent screen 52. Walls 32 and 34 are disposed with respect to rotor 38 to present a generally transversely, triangular chamber portion 58 extending laterally across mill 10 between walls 28. Inlet 24 is located in wall 32 at the upper end of the latter and communicates with portion 58.

During the operation of mill 10, shaft 40, and thereby rotor 38, are rotated in a clockwise direction, viewing FIG. 3, by prime mover 44. Thus, elements 48 are swept past screen 52 in close proximity to the latter throughout its arcuate length. Agricultural products are drawn into mill 10 through inlet 24 from collector 12 by the vacuum induced in conduit 16 and thereby outlet 26 by blower 18. The incoming products are contacted by hammer elements 48 and comminuted thereby into small particles corresponding roughly in size to the size of the openings in screen 52. The length of screen 52 presents a substantial number of openings whereby the comminuted particles are permitted to pass therethrough substantially contemporaneously with the time the same are reduced to the proper size. Particles which have not been properly reduced in size will not pass through screen 52 and it can be seen, viewing FIG. 3, that wall 32 diverges substantially tangentially from the path of travel of elements 48 permitting the unground particles to travel tangentially therealong toward wall 34. This action is illustrated by arrows 60.

Unground particles traveling along the path designated by the arrows 60 will be deflected by wall 34 for movement in a radial direction with respect to rotor 38 as designated by arrows 61. When the particles are contacted by elements 48, the angle of contact will permit clean breakage of the particles rather than attrition of material from the sides thereof which would be the result if the particles were traveling tangentially with respect to the rotor and contacted by a hammer element traveling in substantially the same direction. Furthermore, air entering chamber 36 through inlet 24, contacts the particles deflected from wall 34 and contributes to the tendency for such particles to follow radial path 61 toward rotor 38.

The screen 52 may be removed for cleaning or replacement by the simple expedient of swinging section 22a relatively to section 22b about hinge means 23. In this respect, it is to be appreciated that screen 52 is sufficiently flexible to conform to the arcuate path of straps 53a and 55a during swinging of section 22a about the axis of hinge means 23.

Manifestly, the construction of rotor 38 and the length of screen 52, permits substantially unimpeded flow of air and products through mill 10. Thus, pressure drop through mill 10 is minimal, whereby substantial quantities of air may be pulled therethrough by a blower such as 18, creating a negative pressure in conduit 16.

Hammer mill 10 thus produces a maximum quantity of properly sized products while producing a minimum quantity of fines. Walls 32 and 34, along with the disposition of inlet 24, cooperate to direct unground particles toward rotor 38 in a direction to cause hammer elements to break larger particles into smaller particles without completely disintegrating the larger particles into fines and dust. In addition, the arcuate length of screen 52 permits properly sized particles to leave the comminuting chamber as soon as the particles are properly sized, thereby preventing further contact between the properly sized particles and the hammer. Furthermore, it can be appreciated that, by producing a minimal quantity of fines, the production of properly sized particles is maximized per unit of power consumed by the mill during the operation of the same.

Hence, it can be seen that all of the objects, aims and purposes of the instant invention have been fulfilled in a substantial sense by the provision of a hammer mill such as 10. The use of such a hammer mill eliminates the need for an overhead collector for supplying agricultural products to a gravity fed comminutor, as well as the large blower and conduit for transporting material into the overhead collector. Additionally, hammer mill 10 replaces the previously used gravity fed comminutor and alleviates problems such as excessive production of fines heretofore associated with the grinding of agricultural products.

Having thus described the invention, what is claimed as new and desired to be secured by Letters Patent is:

1. A hammer mill for comminuting agricultural products comprising:

a housing having an inlet and an outlet and defining a chamber therebetween;

a rotor rotatably mounted on said housing within the chamber and having a plurality of radially extending hammer elements thereon located for rotation therewith in a cylindrical path of travel;

an elongated, longitudinally arcuate, perforated screen carried by said housing within the chamber in circumscribing relationship to the rotor and between the latter and the outlet, opposed ends of the screen being located in proximal relationship to said inlet whereby the screen extends around more than one-half of the rotor for maximum product sizing with minimum production of fines;

said housing having a wall extending normal to an imaginary tangent of said path of travel taken at the downstream end of said screen and disposed in spaced relationship from said downstream end whereby unground particles carried beyond said downstream end of the screen by the rotor during rotation of the latter are deflected from said wall substantially radially back toward the rotor; and prime mover means operably coupled with said rotor for rotating the latter.

2. A hammer mill as set forth in claim 1, wherein said screen is of a length to extend about said motor through an arc of approximately 270°.

3. A hammer mill as set forth in claim 1, wherein said screen has sufficient open area to permit substantially unimpeded flow of products and air therethrough.

4. In combination:

a pull-through hammer mill for comminuting agricultural products having an inlet and an outlet and presenting a chamber therebetween, there being a perforated screen disposed within said chamber between the inlet and the outlet for maximum product sizing with minimum production of fines and pressure drop and rotor means between the screen and the inlet for reducing the size of the inlet product;

an elongated conduit for pneumatically conveying said products, said conduit being coupled at one end thereof to said inlet;

said conduit having a discharge chute therein for permitting heavy objects to gravitate therethrough, thereby removing said objects from said products; and a negative pressure inducing blower connected to said outlet for reducing the pressure downstream from the latter and causing said products to be pneumatically conveyed into and through the hammer mill.

References Cited

UNITED STATES PATENTS

| | | | |
|---|---|---|---|
| 1,889,183 | 11/1932 | Rosenfeld | 241—86 X |
| 2,098,480 | 11/1937 | Ammon | 241—51 |
| 2,276,940 | 3/1942 | Dellinger et al. | 241—86 |
| 2,435,226 | 2/1948 | Lanter | 241—86 |
| 2,505,023 | 4/1950 | Williamson | 241—51 |

W. GRAYDON ABERCROMBIE, *Primary Examiner.*